(12) United States Patent  (10) Patent No.: US 8,725,872 B2
Iwanami et al.  (45) Date of Patent: May 13, 2014

(54) INFORMATION PROCESSING APPARATUS, IMAGE FORMING APPARATUS, INFORMATION PROCESSING METHOD, IMAGE FORMING METHOD, AND COMPUTER READABLE MEDIUM

(75) Inventors: Toru Iwanami, Kanagawa (JP); Naoya Yamasaki, Kanagawa (JP); Matsuyuki Aoki, Kanagawa (JP); Shunichiro Shishikura, Kanagawa (JP); Kenjo Nagata, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 258 days.

(21) Appl. No.: 13/369,733

(22) Filed: Feb. 9, 2012

(65) Prior Publication Data

US 2013/0013765 A1    Jan. 10, 2013

(30) Foreign Application Priority Data

Jul. 8, 2011   (JP) ................... 2011-151948

(51) Int. Cl.
  *G06F 15/173*   (2006.01)
  *H04L 12/24*    (2006.01)
  *H04L 12/26*    (2006.01)
(52) U.S. Cl.
  CPC ............. *H04L 41/06* (2013.01); *H04L 43/04* (2013.01); *H04L 43/08* (2013.01)
  USPC ..................................... 709/224; 709/203
(58) Field of Classification Search
  CPC ... H04L 43/0817; H04L 67/125; H04L 41/06; H04L 43/04; H04L 43/08
  USPC ......................... 709/203, 223, 224
  See application file for complete search history.

(56) References Cited

U.S. PATENT DOCUMENTS

| | | | | |
|---|---|---|---|---|
| 6,532,491 | B1 * | 3/2003 | Lakis et al. ................. | 709/223 |
| 6,581,092 | B1 * | 6/2003 | Motoyama et al. .......... | 709/219 |
| 7,296,079 | B2 * | 11/2007 | Motoyama et al. .......... | 709/230 |
| 7,305,449 | B2 * | 12/2007 | Simpson et al. ............. | 709/207 |
| 7,325,054 | B2 * | 1/2008 | Ishimoto ....................... | 709/224 |
| 7,349,964 | B2 * | 3/2008 | Motoyama et al. .......... | 709/224 |
| 7,352,483 | B2 * | 4/2008 | Osanai et al. ................ | 358/1.15 |
| 7,355,730 | B2 * | 4/2008 | Landau et al. ............... | 358/1.14 |
| 7,359,910 | B2 * | 4/2008 | Wu et al. ....................... | 1/1 |
| 7,376,728 | B1 * | 5/2008 | Motoyama et al. .......... | 709/224 |
| 7,774,454 | B2 * | 8/2010 | Yamasaki et al. ............ | 709/224 |
| 7,949,740 | B2 * | 5/2011 | Scrafford et al. ............ | 709/223 |
| 7,984,143 | B2 * | 7/2011 | Sullivan ....................... | 709/224 |
| 8,223,365 | B2 * | 7/2012 | Scaff ........................... | 358/1.15 |

(Continued)

FOREIGN PATENT DOCUMENTS

JP    2000-305886 A    11/2000

*Primary Examiner* — Michael Y Won
(74) *Attorney, Agent, or Firm* — Sughrue Mion, PLLC

(57) ABSTRACT

An information processing apparatus includes an acquiring unit that acquires an information item regarding an operating condition of an image forming apparatus, a first storage controller that stores the information item in a memory, an extracting unit that extracts samples from among the information items stored in the memory in accordance with a predetermined algorithm if an amount of space remaining in the memory is smaller than a predetermined threshold value, where the samples represent results of detection of the operating condition of the image forming apparatus, a statistical unit that computes a statistical value using the samples, a second storage controller that deletes the samples from the memory and stores the statistical value in the memory, and a transmitting unit that transmits the information items to a server via a communication line.

6 Claims, 8 Drawing Sheets

(56) References Cited

U.S. PATENT DOCUMENTS

| | | |
|---|---|---|
| 8,312,122 B2 * | 11/2012 | Ishimoto .................... 709/223 |
| 2002/0184300 A1 * | 12/2002 | Schmeling et al. ........... 709/202 |
| 2003/0055876 A1 * | 3/2003 | Korala et al. ................ 709/203 |
| 2003/0093521 A1 * | 5/2003 | Schlonski et al. ............ 709/224 |
| 2003/0172148 A1 * | 9/2003 | Simpson et al. ............. 709/224 |
| 2004/0141201 A1 * | 7/2004 | Shima ........................ 358/1.15 |
| 2004/0172469 A1 * | 9/2004 | Takahashi et al. ............ 709/224 |
| 2005/0033834 A1 * | 2/2005 | Nutt ............................ 709/223 |
| 2005/0132028 A1 * | 6/2005 | Lester et al. ................. 709/222 |
| 2008/0307089 A1 * | 12/2008 | Sullivan ...................... 709/224 |
| 2013/0051772 A1 * | 2/2013 | Ramaswamy et al. ........ 386/291 |

* cited by examiner

FIG. 2

| ID | NAME | TYPE | ACQUISITION TIMING | SEVERITY LEVEL | ACQUIRED DATA |
|---|---|---|---|---|---|
| 001 | TONER EMPTY | MALFUNCTION | TIME OF OCCURRENCE | A1 | -TONER COLOR<br>-ACCUMULATED NUMBER OF PIXELS SINCE PREVIOUS REPLACEMENT |
| 002 | HIGH-VOLTAGE CHARGING POWER SUPPLY FAIL | MALFUNCTION | TIME OF OCCURRENCE | A2 | -OUTPUT VALUE |
| 003 | SCANNING START POSITION OF LASER SCANNING WRITING UNIT FAIL | MALFUNCTION | TIME OF OCCURRENCE | A3 | -LIGHT INTENSITY MONITORING VALUE OF LASER SCANNING WRITING UNIT<br>-MONITORING VALUE OF INTERVAL BETWEEN SCANNING START POSITIONS |
| 004 | MISS FEED JAM | MALFUNCTION | TIME OF OCCURRENCE | A4 | -JAMMED TRAY |
| 005 | PRE-REGI JAM | MALFUNCTION | TIME OF OCCURRENCE | A4 | -JAMMED TRAY |
| ... | ... | ... | ... | ... | ... |
| 101 | TONER NEAR EMPTY | WARNING | TIME OF OCCURRENCE | B1 | -TONER COLOR<br>-ACCUMULATED NUMBER OF PIXELS SINCE PREVIOUS REPLACEMENT |
| 102 | LIGHT INTENSITY OF LASER SCANNING WRITING UNIT OUTSIDE NORMAL RANGE | MALFUNCTION | TIME OF OCCURRENCE | B2 | -LIGHT INTENSITY MONITORING VALUE<br>-MONITORING VALUE OUTPUT FROM IMAGE DENSITY SENSOR |
| ... | ... | ... | ... | ... | ... |
| 201 | NUMBER OF PIXELS (EACH PAGE) | MONITOR | PAGE BY PAGE | D1 | -SHEET SIZE<br>-NUMBER OF Y PIXELS -NUMBER OF M PIXELS<br>-NUMBER OF C PIXELS -NUMBER OF K PIXELS |
| 202 | IN-APPARATUS TEMPERATURE AND HUMIDITY | MONITOR | EVERY ONE MINUTE | D2 | -TEMPERATURE<br>-HUMIDITY |
| 203 | MONITORING VALUE OUTPUT FROM TONER DENSITY SENSOR | MONITOR | TIME OF UPDATE | D3 | -Y MONITORING VALUE -M MONITORING VALUE<br>-C MONITORING VALUE -K MONITORING VALUE |
| ... | ... | ... | ... | ... | ... |

FIG. 4A

| ID | NAME | TYPE | ACQUISITION TIMING | SEVERITY LEVEL | ACQUIRED DATA |
|---|---|---|---|---|---|
| 001 | TONER EMPTY | MALFUNCTION | TIME OF OCCURRENCE | A1 | -TONER COLOR<br>-ACCUMULATED NUMBER OF PIXELS SINCE PREVIOUS REPLACEMENT |
| 002 | HIGH-VOLTAGE CHARGING POWER SUPPLY FAIL | MALFUNCTION | TIME OF OCCURRENCE | A2 | -OUTPUT VALUE |
| 003 | SCANNING START POSITION OF LASER SCANNING WRITING UNIT FAIL | MALFUNCTION | TIME OF OCCURRENCE | A3 | -LIGHT INTENSITY MONITORING VALUE OF LASER SCANNING WRITING UNIT<br>-MONITORING VALUE OF INTERVAL BETWEEN SCANNING START POSITIONS |
| 004 | MISS FEED JAM | MALFUNCTION | TIME OF OCCURRENCE | A4 | -JAMMED TRAY |
| 005 | PRE-REGI JAM | MALFUNCTION | TIME OF OCCURRENCE | A4 | -JAMMED TRAY |
| ... | ... | ... | ... | ... | ... |
| 101 | TONER NEAR EMPTY | WARNING | TIME OF OCCURRENCE | B1 | -TONER COLOR<br>-ACCUMULATED NUMBER OF PIXELS SINCE PREVIOUS REPLACEMENT |
| 102 | LIGHT INTENSITY OF LASER SCANNING WRITING UNIT OUTSIDE NORMAL RANGE | WARNING | TIME OF OCCURRENCE | B2 | -LIGHT INTENSITY MONITORING VALUE<br>-MONITORING VALUE OUTPUT FROM IMAGE DENSITY SENSOR |
| ... | ... | ... | ... | ... | ... |

FIG. 4B

| ID | NAME | TYPE | ACQUISITION TIMING | SEVERITY LEVEL | ACQUIRED DATA |
|---|---|---|---|---|---|
| 301 | NUMBER OF PIXELS | STATISTICAL VALUE | PERIOD OF TIME | C1 | -NUMBER OF PRINTED SHEETS DURING PERIOD OF TIME (A4L EQUIVALENT)<br>-AVERAGE VALUE OF NUMBER OF Y PIXELS<br>-MAXIMUM VALUE OF NUMBER OF Y PIXELS<br>-MINIMUM VALUE OF NUMBER OF Y PIXELS<br>-AVERAGE VALUE OF NUMBER OF M PIXELS<br>-MAXIMUM VALUE OF NUMBER OF M PIXELS<br>-MINIMUM VALUE OF NUMBER OF M PIXELS<br>-AVERAGE VALUE OF NUMBER OF C PIXELS<br>-MAXIMUM VALUE OF NUMBER OF C PIXELS<br>-MINIMUM VALUE OF NUMBER OF C PIXELS<br>-AVERAGE VALUE OF NUMBER OF K PIXELS<br>-MAXIMUM VALUE OF NUMBER OF K PIXELS<br>-MINIMUM VALUE OF NUMBER OF K PIXELS<br>-AVERAGE VALUE OF NUMBER OF PIXELS IN ONE PAGE<br>-MAXIMUM VALUE OF NUMBER OF PIXELS IN ONE PAGE<br>-MINIMUM VALUE OF NUMBER OF PIXELS IN ONE PAGE |
| 302 | IN-APPARATUS TEMPERATURE AND HUMIDITY | STATISTICAL VALUE | PERIOD OF TIME | C2 | -START TIME OF PERIOD  -END TIME OF PERIOD<br>-AVERAGE TEMPERATURE VALUE<br>-MAXIMUM TEMPERATURE VALUE<br>-MINIMUM TEMPERATURE VALUE  -AVERAGE HUMIDITY VALUE<br>-MAXIMUM HUMIDITY VALUE  -MINIMUM HUMIDITY VALUE |
| 303 | MONITORING VALUE OUTPUT FROM TONER DENSITY SENSOR | MONITOR | TIME OF UPDATE | D3 | -NUMBER OF PRINTED SHEETS DURING PERIOD OF TIME (A4L EQUIVALENT)<br>-AVERAGE Y MONITORING VALUE  -MAXIMUM Y MONITORING VALUE<br>-MINIMUM Y MONITORING VALUE<br>-AVERAGE M MONITORING VALUE  -MAXIMUM M MONITORING VALUE<br>-MINIMUM M MONITORING VALUE<br>-AVERAGE C MONITORING VALUE  -MAXIMUM C MONITORING VALUE<br>-MINIMUM C MONITORING VALUE<br>-AVERAGE K MONITORING VALUE  -MAXIMUM K MONITORING VALUE<br>-MINIMUM K MONITORING VALUE |
| ... | ... | ... | ... | ... | ... |

FIG. 6

| TIME | NUMBER OF PRINTED SHEETS | ID | PARAMETERS | | | | |
|---|---|---|---|---|---|---|---|
| 17:00:00 | 10000 | 202 | 21 | 44 | End | | |
| 17:01:00 | 10000 | 202 | 21 | 43 | End | | |
| 17:01:32 | 10000 | 204 | 50 | 200 | 150 | 51 | END |
| 17:01:33 | 10000 | 203 | 401 | 395 | 410 | 380 | END |
| 17:01:35 | 10001 | 201 | 25 | 20 | 21 | 8 | END |
| 17:01:40 | 10002 | 201 | 20 | 30 | 30 | 10 | END |
| 17:01:43 | 10002 | 203 | 405 | 399 | 412 | 380 | END |
| 17:01:45 | 10003 | 201 | 5 | 6 | 15 | 12 | END |
| 17:01:50 | 10004 | 201 | 0 | 0 | 0 | 7 | END |
| 17:01:53 | 10004 | 203 | 400 | 386 | 405 | 381 | END |
| 17:01:55 | 10005 | 201 | 5 | 6 | 15 | 12 | END |
| 17:02:00 | 10006 | 201 | 0 | 0 | 0 | 7 | END |
| 17:02:03 | 10006 | 203 | 400 | 386 | 405 | 381 | END |
| 17:02:00 | 10006 | 202 | 22 | 43 | End | | |
| 17:02:05 | 10007 | 201 | 0 | 0 | 0 | 9 | END |
| 17:02:06 | 10007 | 101 | 4 | 1215433 | END | | |
| 17:02:10 | 10008 | 201 | 45 | 18 | 41 | 11 | END |
| 17:02:17 | 10008 | 203 | 399 | 390 | 407 | 380 | END |

FIG. 7

| TIME | NUMBER OF PRINTED SHEETS | ID | PARAMETERS | | | | |
|---|---|---|---|---|---|---|---|
| 17:02:06 | 10007 | 101 | 4 | 1215433 | END | | |
| 17:02:14 | 10008 | 301 | 1200 | 12 | 50 | 0 | 15 (TO BE CONTINUED) |
| 17:02:14 | 10008 | 302 | 22:15 | 17:02 | 19 | 23 | 16 (TO BE CONTINUED) |
| 17:02:14 | 10008 | 303 | 1200 | 390 | 407 | 380 | 401 (TO BE CONTINUED) |
| 17:02:14 | 10008 | 304 | 1200 | 50 | 55 | 43 | 205 (TO BE CONTINUED) |

… # INFORMATION PROCESSING APPARATUS, IMAGE FORMING APPARATUS, INFORMATION PROCESSING METHOD, IMAGE FORMING METHOD, AND COMPUTER READABLE MEDIUM

CROSS-REFERENCE TO RELATED APPLICATIONS

This application is based on and claims priority under 35 USC 119 from Japanese Patent Application No. 2011-151948 filed Jul. 8, 2011.

BACKGROUND (i) Technical Field

The present invention relates to an information processing apparatus, an image forming apparatus, information processing method, an image forming method, and a computer readable medium.

(ii) Related Art

SUMMARY

According to an aspect of the invention, there is provided an information processing apparatus including an acquiring unit that acquires an information item regarding an operating condition of an image forming apparatus, a first storage controller that stores the information item acquired by the acquiring unit in a memory, an extracting unit that extracts samples from among the information items stored in the memory in accordance with a predetermined algorithm if an amount of space remaining in the memory is smaller than a predetermined threshold value, where each of the samples represents a result of detection of the operating condition of the image forming apparatus, a statistical unit that computes a statistical value on the basis of the samples extracted by the extracting unit, a second storage controller that deletes the samples extracted by the extracting unit from the memory and stores, in the memory, the statistical value computed by the statistical unit, and a transmitting unit that transmits the information items stored in the memory to a server apparatus connected to the transmitting unit via a communication line.

BRIEF DESCRIPTION OF THE DRAWINGS

An exemplary embodiment of the present invention will be described in detail based on the following figures, wherein:

FIG. 2 illustrates quality property information;

FIG. 4A illustrates quality property information;

FIG. 4B illustrates quality property information;

FIG. 6 illustrates an example of data regarding quality property information in a first mode; and FIG. 7 illustrates an example of data regarding quality property information in a second mode.

DETAILED DESCRIPTION

Configuration

Figure 1:
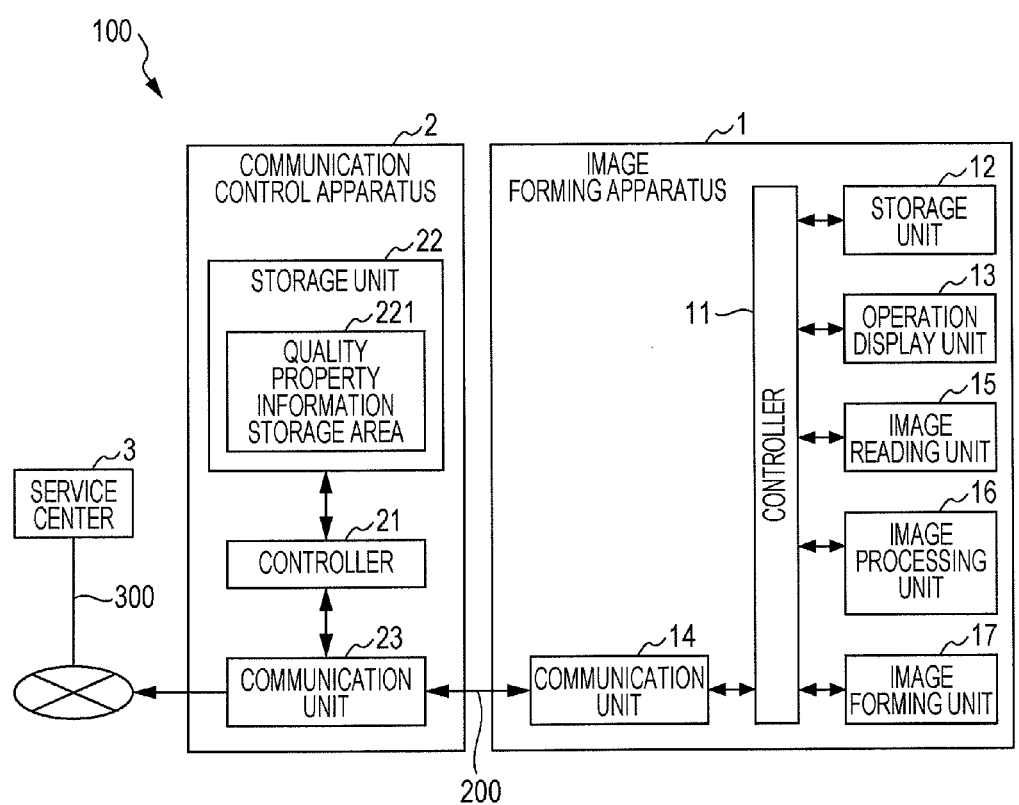
FIG. 1 is a block diagram illustrating an exemplary configuration of a maintenance management system according to an exemplary embodiment of the present invention.

FIG. 1 is a block diagram illustrating an exemplary configuration of a maintenance management system 100 according to an exemplary embodiment of the present invention. As illustrated in FIG. 1, in the maintenance management system 100, an image forming apparatus 1 and a communication control apparatus 2 are connected to each other via a communication line 200, such as a local area network (LAN) so as to be communicable with each other. In addition, the communication control apparatus 2 and a service center 3 are connected to each other via a communication line 300, such as a wide area network (WAN) or a public network so as to be communicable with each other. The image forming apparatus 1 is an example of an image forming apparatus according to the present invention. The image forming apparatus 1 has an image forming function of forming an image on a recording medium, such as a sheet of paper, and a scan function of reading an image formed on a recording medium. However, the functions of the image forming apparatus 1 are not limited thereto. For example, the image forming apparatus 1 may have a facsimile function. In addition, the image forming apparatus 1 is not limited to an image forming apparatus having all of the above-described functions. For example, the image forming apparatus 1 may have only the image forming function without the other functions.

The communication control apparatus 2 is an example of an information processing apparatus according to the present invention. The communication control apparatus 2 includes a storage area for storing information used for maintenance management of the image forming apparatus 1 (hereinafter referred to as "quality property information"). In addition, the communication control apparatus 2 has a function of transmitting the stored quality property information to the service center 3 at a predetermined point in time. The service center 3 receives the quality property information transmitted from the communication control apparatus 2 and stores the quality property information in a predetermined storage unit. In addition, the service center 3 analyzes the received quality property information. The service center 3 is an example of a server apparatus according to the present invention. While, for simplicity, the maintenance management system 100 illustrated in FIG. 1 includes only the image forming apparatus 1 and the communication control apparatus 2, the number of the image forming apparatus 1 and the number of the communication control apparatus 2 may be plural. In addition, there is not always a one-to-one correspondence between the image forming apparatus 1 and the communication control apparatus 2. Plural image forming apparatuses 1 may correspond to a single communication control apparatus 2.

An exemplary hardware configuration of the image forming apparatus 1 is described next with reference to FIG. 1. As illustrated in FIG. 1, a controller 11 includes a central processing unit (CPU), a read only memory (ROM), and a random access memory (RAM). The controller 11 performs overall control of the image forming apparatus 1 in accordance with a computer program stored in the ROM or a storage unit 12. An example of the storage unit 12 is a hard disk. The storage unit 12 stores a variety of programs including the program for controlling the image forming apparatus 1. An operation display unit 13 includes a liquid crystal display functioning as a touch panel. A user of the image forming apparatus 1 performs a variety of operations by touching the liquid crystal display. A communication unit 14 is connected to a communication line 200 using a communication cable. The communication unit 14 communicates data with the communication control apparatus 2 connected to the communication line 200.

An image reading unit 15 includes an optical member (not illustrated). The image reading unit 15 optically reads an image of a document and generates image data representing the read image. An image processing unit 16 performs a variety of image processes, such as color correction and grayscale correction, on the image represented by the input image data. Thus, the image processing unit 16 generates, from the image data subjected to the image processes, yellow (Y) image data, magenta (M) image data, cyan (C) image data, and black (K) image data. Thereafter, the image processing unit 16 performs a screen process on the generated image data and outputs the image data to an image forming unit 17. The image processing unit 16 is formed from an integrated circuit, such as an application specific integrated circuit (ASIC). The image forming unit 17 forms an image on a recording medium using an electrophotographic technique. The image forming unit 17 includes a photoconductor drum, a charging unit, and a fixing unit (none are illustrated). The image forming unit 17 forms Y, M, C, and K toner images on the basis of the Y, M, C, and K image data generated by the image processing unit 16, transfers the toner images onto a sheet of paper, and fixes the toner images to the sheet. In this way, the image forming unit 17 forms an image on the sheet.

An exemplary hardware configuration of the communication control apparatus 2 is described next with reference to FIG. 1. As illustrated in FIG. 1, a controller 21 includes a CPU, a ROM, and a RAM. The controller 21 performs overall control of the communication control apparatus 2 in accordance with a computer program stored in the ROM or a storage unit 22. An example of the storage unit 22 is a hard disk. The storage unit 22 stores a variety of programs including the program for controlling the communication control apparatus 2. The storage unit 22 has a quality property information storage area 221 for storing the quality property information output from the image forming apparatus 1. A communication unit 23 is connected to the communication line 200 and a communication line 300 using communication cables. The communication unit 23 communicates data with the communication control apparatus 2 connected to the communication line 200 and the service center 3 connected to the communication line 300. The controller 21 of the communication control apparatus 2 transmits the quality property information stored in the quality property information storage area 221 to the service center 3 via the communication unit 23 at predetermined intervals. Since this transmission process is performed using a communication line environment for a customer of the image forming apparatus 1 (i.e., the user of the image forming apparatus 1), it is desirable that an adverse impact on the communication line environment of the customer be reduced except when emergency malfunction information is transmitted. Therefore, according to the present exemplary embodiment, it is desirable that the quality property information having a large amount be transmitted to the service center 3 during a communication time slot that is set so as to exclude a period of time during which the image forming apparatus 1 operates for a customer and a maintenance time of the communication line.

The service center 3 stores the quality property information received from the communication control apparatus 2 and analyzes the quality property information. The analysis operation may be performed on the information regarding one of the image forming apparatuses 1 or for the information regarding many of the image forming apparatuses 1. Alternatively, the analysis operation may be performed on the summary of the quality property information regarding many of the image forming apparatuses 1. By analyzing the quality property information, the service center 3 can diagnose whether various events, such as an emergency event, an event to be subjected to maintenance within several days, or an event that can be corrected in a normal maintenance schedule, occurs.

The quality property information is described next with reference to FIG. 2. FIG. 2 illustrates the quality property information. The quality property information indicates the operating condition of the image forming apparatus 1, the performance of the image forming apparatus 1 (e.g., the image quality), and a use status of consumables and parts. An identifier (ID) that identifies the operating condition of the image forming apparatus 1 is assigned to the quality property information. In FIG. 2, the information in "ID" represents an ID assigned to each type of the quality property information. The item "type" indicates the type of quality property information. The item "acquisition timing" indicates when the communication control apparatus 2 acquires the quality property information from the image forming apparatus 1. The item "severity" indicates a severity level assigned to the quality property information. In the levels of severity, "A" indicates the highest level, and the level of severity decreases from "B" to "D" through "C". The severity A indicates a condition in which malfunction occurs and the image forming apparatus 1 does not operate. The severity B indicates a condition in which the consumable and a part need to be replaced. The severity C is described in detail below and, therefore, description of the severity C is not provided here. The severity D is assigned to each of samples representing the results of detection of the operating conditions of the image forming apparatus 1 performed at predetermined intervals. The item "acquired data" indicates a parameter included in the quality property information of each of the types.

More specifically, the quality property information having an ID of "001" assigned thereto indicates that the toner cartridge is empty. In such a case, data "toner color" and "number of pixels accumulated since previous replacement" are acquired from the image forming apparatus 1. In addition, the quality property information having an ID of "002" assigned thereto indicates that a high-voltage charging power supply for charging the photoconductor drum malfunctions. In such a case, the data "output value" indicating the voltage level or the electrical current value of the high-voltage charging power supply is acquired from the image forming apparatus 1. Furthermore, the quality property information having an ID of "003" assigned thereto indicates that a scanning start position of a laser scanning writing unit is not normal. In such a case, the light intensity monitoring value and a monitoring value of the interval of the scanning start positions in the sub-scanning direction are acquired from the image forming apparatus 1. Still furthermore, the quality property information having an ID of "004" assigned thereto indicates that feeding of a sheet fails. In such a case, data indicating a "jammed tray" is acquired from the image forming apparatus 1. Yet still furthermore, the quality property information having an ID of "005" assigned thereto indicates the occurrence of paper jam before a pre-registration point. In such a case, data indicating a "jammed tray" is acquired from the image forming apparatus 1.

In addition, the quality property information having an ID of "101" assigned thereto indicates that the toner level in the cartridge is low. In such a case, data "toner color" and "number of pixels accumulated since previous replacement" are acquired from the image forming apparatus 1. Furthermore, the quality property information having an ID of "102" assigned thereto indicates that the light intensity of a laser scanning writing unit is outside the normal range. In such a case, the "light intensity monitoring value" and a "monitoring value of an image density monitor sensor" are acquired from the image forming apparatus 1. Still furthermore, the quality property information having an ID of "201" assigned thereto indicates the result of monitoring of the number of pixels that turns ON during a rasterizing operation for each of the toner colors. In such a case, data indicating a "sheet size", the "number of Y (yellow) pixels", the "number of M (magenta) pixels", the "number of C (cyan) pixels", and the "number of K (black) pixels" are acquired from the image forming apparatus 1. Yet still furthermore, the quality property information having an ID of "202" assigned thereto indicates the results of monitoring of the temperature and humidity inside the image forming apparatus 1. In such a case, data indicating a "temperature" and "humidity" are acquired from the image forming apparatus 1 every one minute. The quality property information having an ID of "203" assigned thereto indicates the toner densities (i.e., the ratios of the toner to the carrier) of the toner colors. In such a case, data indicating a "Y monitoring value", an "M monitoring value", a "C monitoring value", and a "K monitoring value" are acquired from the image forming apparatus 1. Note that the quality property information is not limited to that illustrated in FIG. 2. For example, the monitoring value of the temperature of the fixing unit may be employed. That is, any information used for a maintenance management of the image forming apparatus 1 can be employed as the quality property information.

The quality property information having the severity level A or B (hereinafter referred to as "first quality property information") is acquired each time the event occurs. The first quality property information is used to investigate the cause of malfunction. In contrast, the quality property information having the severity level D (hereinafter referred to as "second quality property information") is a sample acquired for every predetermined unit process (e.g., for every page) or every unit time (e.g., every one minute). The second quality property information is used to estimate the probability of the occurrence of failure. Since the quality property information having the severity level D is a sample acquired for every predetermined unit process or every unit time, the amount of accumulated data is large. Since an event having the severity level A or B rarely occur, it is desirable that the quality property information having the severity level D be accumulated as much as possible in a normal use environment.

According to the present exemplary embodiment, as illustrated in FIG. 2, a single-digit or two-digit ID number is assigned to the quality property information having the severity level A. In contrast, an ID number in the 100s is assigned to the quality property information having the severity level B, and an ID number in the 200s is assigned to the quality property information having the severity level D.

Figure 3:
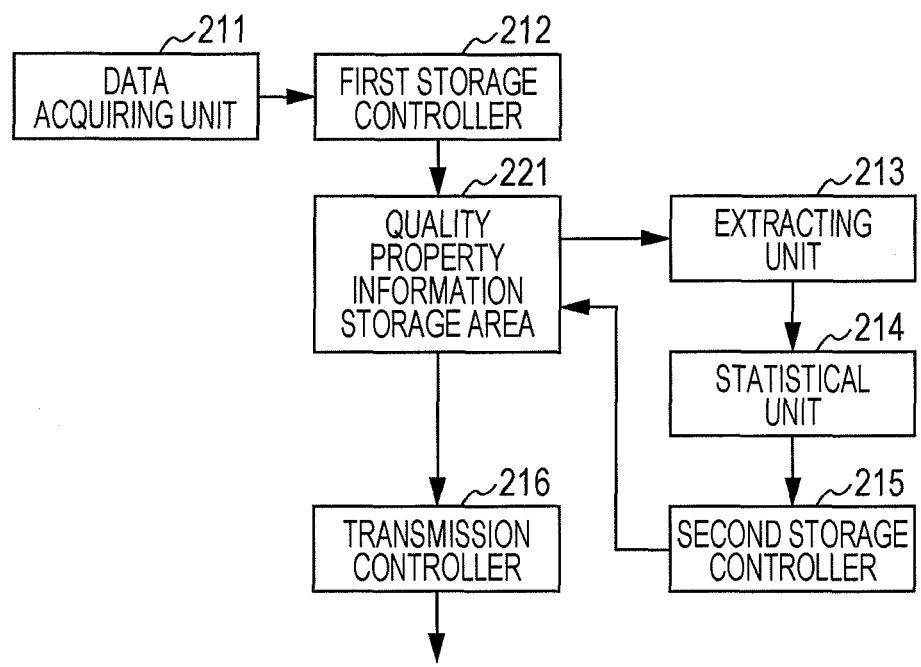
FIG. 3 is a block diagram of an exemplary functional configuration of a communication control apparatus.

An exemplary functional configuration of the communication control apparatus 2 is described next with reference to the accompanying drawings. FIG. 3 is a block diagram of an exemplary functional configuration of the communication control apparatus 2. In FIG. 3, a data acquiring unit 211, a first storage controller 212, an extracting unit 213, a statistical unit 214, and a second storage controller 215 are realized by the controller 21 that reads a computer program from the ROM or the storage unit 22 and executes the computer program.

In FIG. 3, the data acquiring unit 211 acquires the quality property information from the image forming apparatus 1. The data acquiring unit 211 is an example of an acquiring unit according to the present invention. The first storage controller 212 sequentially appends the quality property information acquired by the data acquiring unit 211 into the quality property information storage area 221. In this way, the first storage controller 212 stores the acquired quality property information in the quality property information storage area 221. That is, the quality property information is written into the quality property information storage area 221 in a time-series manner. The first storage controller 212 is an example of a first storage controller according to the present invention.

If the amount of space remaining in the quality property information storage area 221 (the free space) is smaller than a predetermined threshold value, the extracting unit 213 extracts the quality property information items having the severity level D (i.e., the second quality property information) from the quality property information storage area 221 in accordance with a predetermined algorithm. The extracting unit 213 is an example of an extracting unit according to the present invention. In this example, the extracting unit 213 determines whether the amount of space remaining in the quality property information storage area 221 is smaller than the predetermined threshold value at predetermined unit time intervals (e.g., every one hour or every 10 minutes). If the determination is "No" (i.e., if the amount of remaining space is larger than or equal to the predetermined threshold value), the extracting unit 213 does not extract the quality property information and waits until the amount of remaining space becomes smaller than the predetermined threshold value. However, if the determination is "Yes" (i.e., if the amount of remaining space is smaller than the predetermined threshold value), the extracting unit 213 extracts the second quality property information items from among the quality property information items stored in the quality property information storage area 221. This extracting process is performed by identifying each of the IDs of the quality property information items stored in the quality property information storage area 221. More specifically, according to the present exemplary embodiment, the quality property information items having the IDs that are numbers in the 200s are extracted by the extracting unit 213. In the following description, for convenience of description, a mode in which the amount of remaining space is larger than or equal to the predetermined threshold value is referred to as a "first mode". In contrast, a mode in which the amount of remaining space is smaller than the predetermined threshold value is referred to as a "second mode".

The statistical unit 214 computes a statistical value on the basis of the second quality property information items extracted by the extracting unit 213. The statistical unit 214 is an example of a statistical unit according to the present invention. More specifically, according to the present exemplary embodiment, the statistical unit 214 performs a statistical process on the second quality property information items in terms of, for example, the number of pixels, the in-apparatus temperature values, and the toner temperature values for a predetermined period of time. Thus, the statistical unit 214 computes the average value, the median value, the mode value, the standard deviation, the maximum value, the minimum value, and the histogram of the second quality property information items in terms of each of the measured items.

The second storage controller 215 deletes the second quality property information items extracted by the extracting unit 213 from the quality property information storage area 221 and stores, in the quality property information storage area 221, a result of the statistical process performed by the statistical unit 214 in the form of the quality property information. The second storage controller 215 is an example of a second storage controller according to the present invention. A transmission controller 216 illustrated in FIG. 3 transmits the quality property information items stored in the quality property information storage area 221 to the service center 3 connected thereto via the communication line 300 at a predetermined point in time. The transmission controller 216 is an example of a transmitting unit according to the present invention.

FIGS. 4A and 4B illustrate the quality property information stored in the quality property information storage area 221 in the second mode. As can be seen from comparison of FIG. 2 and FIGS. 4A and 4B, the first quality property information has the same format in the first mode (refer to FIG. 2) and second mode (refer to FIG. 4A). This is because the amount of the first quality property information is small and, in addition, the first quality property information is basic information. In contrast, the second quality property information (the quality property information having the severity level D) output from the image forming apparatus 1 is directly stored in the first mode. However, in the second mode, the second quality property information is subjected to the statistical process and is stored in the form of the quality property information having the severity level C. More specifically, for example, in terms of the number of pixels, one of the information item having the ID "201" and having the severity level D and the information item having the ID "301" and having the severity level C is stored in accordance with the type of mode. Similarly, in terms of the in-apparatus temperature and humidity, one of the information items having the IDs "202" and "302" is stored in accordance with the type of mode. In terms of the toner density, one of the information items having the IDs "203" and "303" is stored in accordance with the type of mode. As illustrated in FIG. 4B, the information item having the severity level C and stored in the second mode includes information indicating the result of the statistical process as parameters (i.e., the average value, the maximum value, and the minimum value of the parameters included in the information items having the severity level D).

Operation

Figure 5:
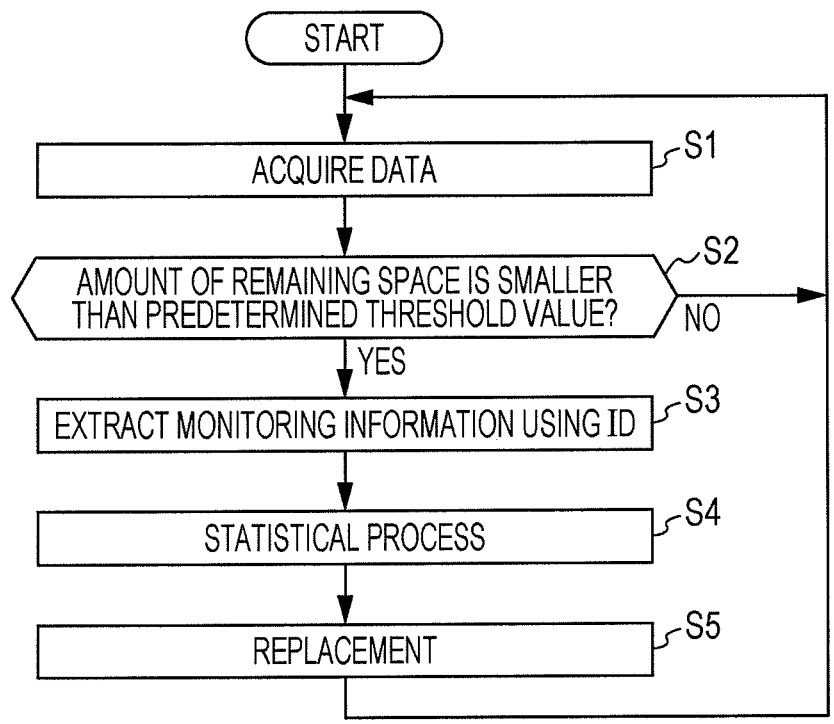
FIG. 5 is a flowchart of an exemplary process performed by the communication control apparatus.

An exemplary operation performed by the communication control apparatus 2 is described next with reference to a flowchart illustrated in FIG. 5. Upon receipt of a quality property information item from the image forming apparatus 1 (step S1), the controller 21 of the communication control apparatus 2 stores the received quality property information item in the quality property information storage area 221. The controller 21 determines whether the amount of space remaining in the quality property information storage area 221 is smaller than a predetermined threshold value (step S2). If the determination is "No" ("NO" in step S2), the processing returns to step S1, where the controller 21 waits until the amount of space remaining in the quality property information storage area 221 becomes smaller than the predetermined threshold value. If the amount of remaining space becomes smaller than the predetermined threshold value ("YES" in step S2), the controller 21 extracts second quality property information items from among the quality property information items stored in the quality property information storage area 221 (step S3). The controller 21 performs a statistical process on the extracted second quality property information items (step S4). Thereafter, the controller 21 replaces the second quality property information items stored in the quality property information storage area 221 with the information item obtained through the statistical process (step S5). After the processing in step S5 is completed, the processing performed by the controller 11 returns to step S1, where the controller 11 acquires data.

An example of the quality property information item stored in the quality property information storage area 221 is described next with reference to FIGS. 6 and 7. FIG. 6 illustrates an example of information stored in the quality property information storage area 221 in the first mode. FIG. 7 illustrates an example of information stored in the quality property information storage area 221 in the second mode. In the example illustrated in FIGS. 6 and 7, the image forming apparatus 1 has a printing performance of 12 sheets per minute. During a printing operation, the toner density is measured once every two sheets. In the example illustrated in FIG. 6, the image forming apparatus 1 begins operating from early morning, and data obtained in the operating time from 17:00 to 17:02 are illustrated. As illustrated in FIG. 6, the quality property information item includes the following items "time", "number of printed sheets", "ID" and "parameters" in association with one another. Among these items, the item "time" stores information indicating the point in time at which the quality property information item is generated. The item "number of printed sheets" stores the number of sheets on which images are formed. The item "ID" stores an ID for identifying the type of the quality property information item. The item "parameters" stores the parameters included in the quality property information item. Since the number of parameters is different from type to type of quality property information, "END" is written into the last field. Fields subsequent to the last field remain empty.

In FIGS. 6 and 7, the controller 21 of the communication control apparatus 2 operates in the first mode first. At 17:02, the amount of space remaining in the quality property information storage area 221 becomes smaller than the threshold value. Accordingly, after 17:02, the controller 21 of the communication control apparatus 2 operates in the second mode. In the second mode, as illustrated in FIG. 7, the controller 21 does not directly store information having the severity level D (i.e., second quality property information), such as the number of pixels, the in-apparatus temperature, and the toner density. The controller 21 replaces these information items with the statistical values obtained for each of the predetermined periods of time. Thus, the controller 21 converts the information items having the severity level D into an information item having the severity level C and stores the information. In addition, the controller 21 converts information items obtained from the time when the controller 21 previously transmits information items to the service center 3 (e.g., on the previous day) to the current time into the statistical values and stores the converted information. At that time, the controller 21 deletes the previous information having the severity level D. Through the above-described process performed by the controller 21, a free space can be generated in the quality property information storage area 221 and, thus, information having the severity level A or B is not lost due to overwriting.

By analyzing plural information items having the severity level D at the same time, it can be determined whether the values of the information items gradually vary, abruptly vary at some point in time, or are continuously varying. Thus, the tendency of a variation in the values of information items can be obtained. In addition, although unlike the information having the severity level D, it is difficult to precisely analyze the information having the severity level C, the properties of the parent population can be obtained as statistical values and, thus, rough analysis can be applied. Accordingly, by storing the information having the severity level C instead of the information having the severity level D, the information acquired during the period of time is not lost. In addition, according to the present exemplary embodiment, if the amount of space remaining in the quality property information storage area 221 is smaller than the threshold value, the quality property information items are classified into the first quality property information and the second quality property information. Thereafter, a statistical process is performed on the second quality property information, and the second quality property information items are replaced with the resultant information of the statistical process. Therefore, the number of transmission operations and the data amount of the quality property information transmitted to the service center 3 do not increase. That is, the load imposed on the operation for transmitting the quality property information to the service center 3 does not increase.

Modifications

While the present invention has been described with reference to the exemplary embodiment, the present invention is not limited to the exemplary embodiment. Various other embodiments can be made. An example of other embodiments is described below. Note that the following embodiments may be appropriately combined.

(1) While the above exemplary embodiment has been described with reference to the image forming apparatus 1 and the communication control apparatus 2 separately provided and connected via the communication line 200, the image forming apparatus 1 and the communication control apparatus 2 may be integrated into one body. That is, a controller of an image forming apparatus including an image forming unit that forms an image may generate the quality property information and store the quality property information in a quality property information storage area. Thereafter, if the amount of space remaining in the quality property information storage area is smaller than a predetermined threshold value, the controller may extract second quality property information items from the quality property information stored in the storage area. Subsequently, the controller may overwrite the storage area with information obtained by performing a statistical process on the extracted second quality property information items.

(2) While the above exemplary embodiment has been described with reference to the extracting unit 213 that extracts quality property information items having the ID numbers in the 200s and extracts the second quality property information items from the quality property information, the second quality property information items may be extracted using another technique. For example, the extracting unit 213 may extract the second quality property information items by extracting the quality property information items having IDs that are smaller than a predetermined threshold value. Alternatively, for example, the extracting unit 213 may extract the second quality property information items by extracting the quality property information items including a predetermined number of parameters or more. That is, any extracting unit 213 that can extract the second quality property information items from among the quality property information items stored in the quality property information storage area 221 in accordance with a predetermined algorithm can be employed.

(3) While the above exemplary embodiment has been described with reference to the statistical unit 214 that computes statistical values, such as the average value, the median value, the mode value, the standard deviation, the maximum value, the minimum value, and the histogram, the statistical values are not limited thereto. That is, any statistical unit 214 that computes the following information from the extracted second quality property information items can be employed: the information that indicates the characteristics of a set of the second quality property information items or a time variation in the second quality property information and that has the amount of data smaller than that of the set of the second quality property information items.

(4) In the above-described exemplary embodiment, the controller 21 may perform the statistical process at variable intervals. That is, the controller 21 may perform the statistical process so that as the amount of space remaining in the quality property information storage area 221 decreases, the amount of data of information representing the result of the statistical process decreases. More specifically, for example, the controller 21 may increase the period of a unit time used for the statistical process as the amount of space remaining in the quality property information storage area 221 decreases. Alternatively, for example, the controller 21 may decrease the number of parameters in the quality property information as the amount of space remaining in the quality property information storage area 221 decreases.

(5) In the above-described exemplary embodiment, plural severity levels may be assigned to the second quality property information items, and the controller 21 may determine the severity level of the quality property information item in accordance with a predetermined algorithm. If the amount of space remaining in the quality property information storage area 221 is smaller than a predetermined threshold value, the controller 21 may extract the second quality property information items having a severity level that is lower than a predetermined threshold value from the quality property information items stored in the quality property information storage area 221 and perform the statistical process. The controller 21 may determine the severity level of the quality property information item by determining, for example, the ID of the quality property information item. Alternatively, for example, a quality property information item may include the information indicating the severity level, and the controller 21 may determine the severity level of the quality property information item by referring to the information included in the quality property information item.

(6) The program stored in the ROM or the storage unit 22 of the communication control apparatus 2 may be provided in the form of a computer-readable recording medium. Examples of the computer-readable recording medium include a magnetic recording medium (e.g., a magnetic tape, a magnetic disk, such as hard disk drive (HDD), or a flexible disk (FD)), an optical recording medium (e.g., an optical disk), a magnetooptical recording medium, and a semiconductor memory. Alternatively, the program may be downloaded into the communication control apparatus 2 via a communication line, such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:
1. An information processing apparatus comprising:
   an acquiring unit that acquires an information item regarding an operating condition of an image forming apparatus;
   a first storage controller that stores the information item acquired by the acquiring unit in a memory;
   an extracting unit that extracts samples from among the information items stored in the memory in accordance with a predetermined algorithm if an amount of space remaining in the memory is smaller than a predeter- mined threshold value, the samples each representing a result of detection of the operating condition of the image forming apparatus;
a statistical unit that computes a statistical value on the basis of the samples extracted by the extracting unit;
a second storage controller that deletes the samples extracted by the extracting unit from the memory and stores, in the memory, the statistical value computed by the statistical unit; and
a transmitting unit that transmits the information items stored in the memory to a server apparatus connected to the transmitting unit via a communication line.

2. The information processing apparatus according to claim 1, further comprising:
a severity determining unit that determines a severity level of each of the information items stored in the memory in accordance with a predetermined algorithm;
wherein if the amount of space remaining in the memory is smaller than the predetermined threshold value, the extracting unit extracts, from among quality identification information items stored in the memory, the samples having a severity level that is determined to be lower than a predetermined threshold value by the severity determining unit.

3. An image forming apparatus comprising:
an image forming unit that forms an image;
a first storage controller that generates an information item regarding an operating condition of an image forming apparatus and stores the information item in a memory;
an extracting unit that extracts samples from among the information items stored in the memory in accordance with a predetermined algorithm if an amount of space remaining in the memory is smaller than a predetermined threshold value, the samples each representing a result of detection of the operating condition of the image forming apparatus;
a statistical unit that computes a statistical value on the basis of the samples extracted by the extracting unit;
a second storage controller that deletes the samples extracted by the extracting unit from the memory and stores, in the memory, the statistical value computed by the statistical unit; and
a transmitting unit that transmits the information items stored in the memory to a server apparatus connected to the transmitting unit via a communication line.

4. A non-transitory computer readable medium storing a program causing a computer to execute a process for processing information, the process comprising:
acquiring an information item regarding an operating condition of an image forming apparatus;
storing the acquired information item in a memory;
extracting samples from among the information items stored in the memory in accordance with a predetermined algorithm if an amount of space remaining in the memory is smaller than a predetermined threshold value, the samples each representing a result of detection of the operating condition of the image forming apparatus;
computing a statistical value on the basis of the extracted samples;
deleting the extracted samples from the memory and storing the computed statistical value in the memory; and
transmitting the information items stored in the memory to a server apparatus via a communication line.

5. An information processing method comprising:
acquiring an information item regarding an operating condition of an image forming apparatus;
storing the acquired information item in a memory;
extracting samples from among the information items stored in the memory in accordance with a predetermined algorithm if an amount of space remaining in the memory is smaller than a predetermined threshold value, the samples each representing a result of detection of the operating condition of the image forming apparatus;
computing a statistical value on the basis of the extracted samples;
deleting the extracted samples from the memory and storing the computed statistical value in the memory; and
transmitting the information items stored in the memory to a server apparatus via a communication line.

6. An image forming method comprising:
forming an image;
generating an information item regarding an operating condition of an image forming apparatus and storing the information item in a memory;
extracting samples from among the information items stored in the memory in accordance with a predetermined algorithm if an amount of space remaining in the memory is smaller than a predetermined threshold value, the samples each representing a result of detection of the operating condition of the image forming apparatus;
computing a statistical value on the basis of the extracted samples;
deleting the extracted samples from the memory and storing the computed statistical value in the memory; and
transmitting the information items stored in the memory to a server apparatus connected to the image forming apparatus via a communication line.

* * * * *